United States Patent
Endo

(10) Patent No.: US 7,789,177 B2
(45) Date of Patent: Sep. 7, 2010

(54) CONTROL APPARATUS AND CONTROL METHOD FOR DRIVE APPARATUS OF HYBRID VEHICLE

(75) Inventor: Hiroatsu Endo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1073 days.

(21) Appl. No.: 10/550,738

(22) PCT Filed: Mar. 16, 2005

(86) PCT No.: PCT/IB2005/000666

§ 371 (c)(1),
(2), (4) Date: Sep. 26, 2005

(87) PCT Pub. No.: WO2005/090109

PCT Pub. Date: Sep. 29, 2005

(65) Prior Publication Data

US 2006/0196711 A1    Sep. 7, 2006

(30) Foreign Application Priority Data

Mar. 24, 2004   (JP)   ............... 2004-087163

(51) Int. Cl.
*B60W 10/08* (2006.01)
(52) U.S. Cl. .................. 180/65.265; 180/66.275; 180/65.285
(58) Field of Classification Search ....... 180/65.2–65.4; 903/942, 946, 947; 477/3
See application file for complete search history.

(56) References Cited

U.S. PATENT DOCUMENTS

| | | | | |
|---|---|---|---|---|
| 5,833,570 A * | 11/1998 | Tabata et al. | ................... | 477/3 |
| 5,982,045 A * | 11/1999 | Tabata et al. | .................. | 290/17 |
| 6,018,198 A * | 1/2000 | Tsuzuki et al. | ................ | 290/17 |
| 6,409,623 B1 * | 6/2002 | Hoshiya et al. | ................ | 475/5 |
| 6,761,659 B2 * | 7/2004 | Eguchi et al. | ............... | 475/174 |
| 7,331,899 B2 * | 2/2008 | Ortmann et al. | ................ | 477/6 |
| 2003/0109360 A1 * | 6/2003 | Eguchi et al. | ............... | 477/175 |
| 2004/0192494 A1 * | 9/2004 | Ozeki et al. | .................... | 477/3 |
| 2004/0254046 A1 * | 12/2004 | Ozeki et al. | .................... | 477/3 |
| 2005/0181909 A1 * | 8/2005 | Oshiumi et al. | ............. | 477/156 |

FOREIGN PATENT DOCUMENTS

JP    09-322307 A    12/1997

* cited by examiner

*Primary Examiner*—Glenn Dayoan
*Assistant Examiner*—Vaughn T Coolman
(74) *Attorney, Agent, or Firm*—Kenyon & Kenyon LLP

(57) ABSTRACT

A control method for a drive apparatus of a hybrid vehicle in which an assist power source is connected to an output member connected to an engine through a torque transmitting member whose torque capacity is changed according to an engagement control amount includes the steps of maintaining a rotational speed of the assist power source at a predetermined rotational speed (step (S02); continuously changing the engagement control amount while maintaining the rotational speed of the assist power source at the predetermined rotational speed (step S04); and leaning a relationship between output torque of the assist power source for maintaining the rotational speed of the assist power source and the engagement control amount when the output torque of the assist power source reaches a predetermined value while the engagement control amount is changed (step S06).

12 Claims, 5 Drawing Sheets

F I G. 1
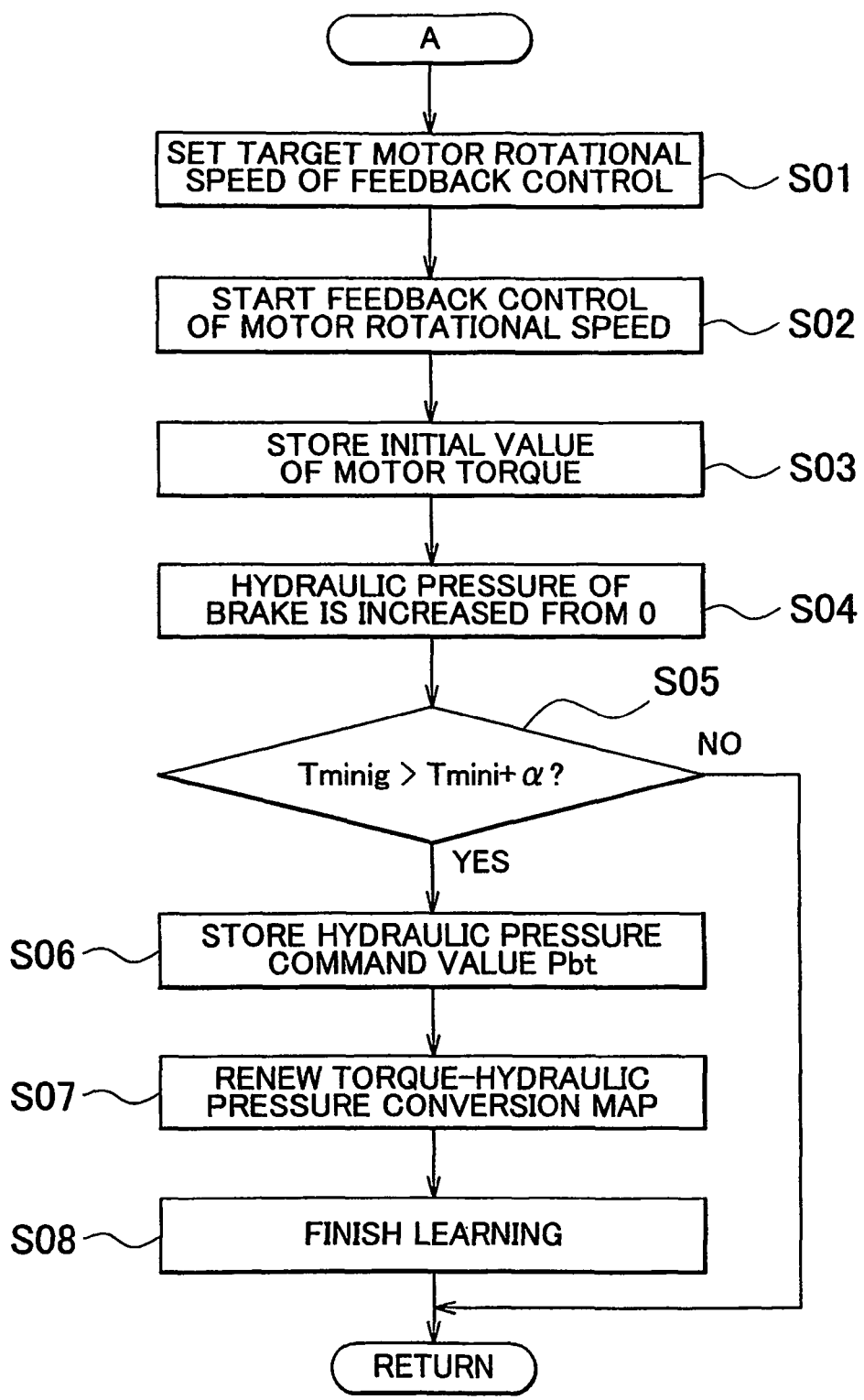

CONTROL APPARATUS AND CONTROL METHOD FOR DRIVE APPARATUS OF HYBRID VEHICLE

INCORPORATION BY REFERECNCE

This is a 371 national phase application of PCT/IB05/00666 filed 16 Mar. 2005, claiming priority to Japanese Patent Application No. 2004-087163 filed 24 Mar. 2004, the contents of which are incorporated herein by reference.

Field of the Invention

The invention relates to a drive apparatus of a hybrid vehicle including plural driving force sources. More particularly, the invention relates to a control apparatus and a control method which control torque capacity between a motor having a torque assist function and an output member.

Background of the Invention

A hybrid drive apparatus includes a motor or a motor/generator in addition to an internal combustion engine as a driving source, in order to operate the internal combustion engine as efficiently as possible. An example of the hybrid drive apparatus is disclosed in Japanese Patent Application Publication No. JP-A-9-322307. In the hybrid drive apparatus, an internal combustion engine, a motor/generator, and a rotation shaft are connected to a planetary gear mechanism which produces a differential effect. Torque output from the internal combustion engine is distributed to the motor/generator and the rotation shalt, that is, reaction force torque is provided by the motor/generator, whereby a rotational speed of the internal combustion engine and torque output to the rotation shaft are controlled.

Accordingly, the internal combustion engine can be controlled so as to be operated at an operating point where the optimal fuel efficiency can be achieved, and a substantial gear ratio can be continuously changed. However, in order to further improve efficiency of transmitting power, and to make it possible to achieve various operating states, a stepped transmission may be provided on an engine side of an output shaft. In the apparatus disclosed in the Japanese Patent Application Publication No. JP-A-9-322307, the rotation shaft serves as an input shaft of an automatic transmission in which plural forward speeds can be set using a friction engagement device.

The friction engagement device is configured such that torque capacity is changed according to engagement hydraulic pressure. Therefore, in order to perform shifting without causing a shock, it is necessary to appropriately control the engagement hydraulic pressure at the time of shifting transition. Accordingly, in the Japanese Patent Application Publication No. JP-A-9-322307, torque of the motor/generator is controlled so that an input rotational speed of the automatic transmission is changed according to a target rotational speed at the time of shifting. Based on a correction amount of the torque input to the input shaft, a duty ratio of a solenoid valve which controls initial hydraulic pressure of the friction engagement device relating to shifting is corrected. A correction amount of the duty ratio is stored so that the initial hydraulic pressure is changed at the time of shifting.

The shifting in the automatic transmission proceeds as engagement or disengagement of the friction engagement device proceeds. In addition, a predetermined rotational speed such as the input rotational speed is gradually changed at the time of shifting. Accordingly, if the actual rotational speed is different from the target rotational speed, there is excess or deficiency of the rotational speed when the friction engagement device is engaged or disengaged. This is caused by excess or deficiency of engagement pressure or disengagement pressure of the friction engagement device with respect to the torque. Accordingly, in the Japanese Patent Publication Application No. JP-A-9-322307, the torque is controlled by the motor/generator so that the input rotational speed becomes close to the target rotational speed. As a result, the correction amount of the torque of the motor/generator corresponds to the excess or deficiency of the engagement pressure or the disengagement pressure of the friction engagement device. Therefore, the correction amount of the torque is used for correcting the initial hydraulic pressure of the friction engagement device.

Since the target rotational speed is changed with time when shifting is performed, the correction amount of the torque is increased or decreased with time in the case where the torque is corrected so that the input rotational speed becomes close to the target rotational speed. Meanwhile, a relationship between specific torque capacity of the friction engagement device and hydraulic pressure to be applied to the friction engagement device is static. The correction value used for correcting the initial hydraulic pressure or initial characteristic of the friction engagement device is an average value of the correction amounts obtained during shifting, or a value obtained by numerical processing. In other words, the average value of the correction values obtained when the engagement or disengagement has already proceeded is employed as the correction value of the initial hydraulic pressure in an initial stage of engagement or disengagement. Therefore, the characteristic of the friction engagement device in the initial stage of engagement or disengagement cannot be accurately reflected when the initial hydraulic pressure is corrected. Thus, torque control using the friction engagement device may become different from ideal torque control, and accordingly a shock may be caused or a driver may feel that driving force is insufficient.

DISCLOSURE OF THE INVENTION

It is an object of the invention to provide a control apparatus and a control method for a drive apparatus of a hybrid vehicle, which includes a torque transmitting member whose torque capacity is changed according to an engagement control amount, and which can accurately set a relationship between an engagement control amount and the torque capacity in an initial stage when the torque transmitting member starts to transmit torque.

According to the invention, a relationship between an engagement control amount and torque capacity of a torque transmitting member is learned based on a change in a behavior or a control amount of a motor, which is caused while the engagement control amount of the torque transmitting member is changed in a drive apparatus of a hybrid vehicle. A first aspect of the invention relates to a control apparatus for a drive apparatus of a hybrid vehicle, in which a motor is connected to an output member connected to a main power source through a torque transmitting member whose torque capacity is changed according to an engagement control amount. The control apparatus includes maintaining means for maintaining a rotational speed of the motor at a predetermined rotational speed; changing means for continuously changing the engagement control amount while the maintaining means maintains the rotational speed of the motor at the predetermined rotational speed; and learning means for learning a relationship between output torque of the motor for maintaining the rotational speed of the motor at the predetermined rotational speed and the engagement control amount when the output torque of the motor reaches a predetermined value while the engagement control amount is changed.

In the control apparatus for a drive apparatus of a hybrid vehicle, when the engagement control amount of the torque transmitting member which is provided between the motor and the output member is changed while the rotational speed of the motor is maintained at the predetermined rotational speed, torque acting on the motor is changed, and therefore the output torque necessary for maintaining the rotational speed of the motor at the predetermined rotational speed is changed. The output torque of the motor can be accurately detected, for example, based on an electric current value. Since the output torque corresponds to the torque capacity of the torque transmitting member, when the output torque of the motor reaches the predetermined value, it is possible to accurately learn the relationship between the output torque of the motor and the engagement control amount, that is, the relationship between the engagement control amount and the torque capacity of the torque transmitting member, without being influenced by noise or the like. Accordingly, it is possible to accurately learn the characteristic of the torque transmitting member in the initial stage of the engagement.

The control apparatus for a drive apparatus of a hybrid vehicle may further include detecting means for detecting initial output torque of the motor while the engagement control amount is zero, and the predetermined value may be set to a value obtained by adding predetermined torque to the initial output torque detected by the detecting means.

In this case, since the initial torque of the motor is detected while the engagement control amount is zero, the initial torque is detected as drag torque of the torque transmitting member. Therefore, it is possible to accurately detect the drag torque of the torque transmitting member. Also, when the output torque of the motor exceeds the torque obtained by adding the predetermined value to the drag torque while the engagement control amount is changed, the relationship between the engagement control amount and the torque capacity of the torque transmitting member is learned. Therefore, it is possible to accurately learn the initial characteristic of the torque transmitting member considering the drag torque.

A second aspect of the invention relates to a control method for a drive apparatus of a hybrid vehicle in which a motor is connected to an output member connected to a main power source through a torque transmitting member whose torque capacity is changed according to an engagement control amount. The control method includes the steps of maintaining a rotational speed of the motor at a predetermined rotational speed; continuously changing the engagement control amount while maintaining the rotational speed of the motor at the predetermined rotational speed; and learning a relationship between output torque of the motor for maintaining the rotational speed of the motor at the predetermined rotational speed and the engagement control amount when the output torque of the motor reaches a predetermined value while the engagement control amount is changed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a flow chart showing learning control for detecting a relationship between torque and hydraulic pressure;

DETAILED DESCRIPTION OF THE PREFERRED EMBODIMENTS

Figure 3:
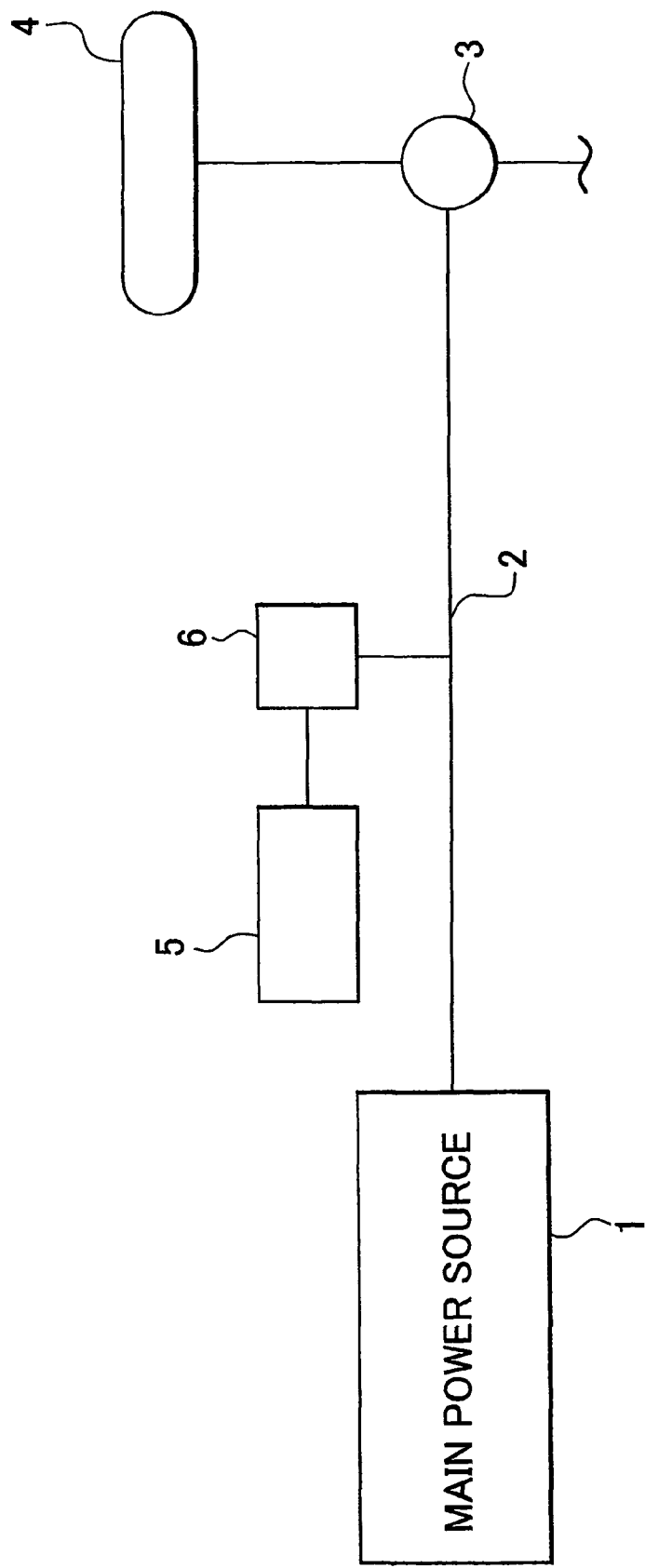
FIG. 3 is a schematic diagram showing a drive apparatus for a hybrid vehicle according to the invention.

Hereinafter, an embodiment of the invention will be described. As shown in FIG. 3, in a hybrid drive apparatus according to the embodiment of the invention, torque of a main power source (i.e., a first power source) 1 is transmitted to an output member 2, and the torque is transmitted from the output member 2 to a drive wheel 4 through a differential 3. Meanwhile, an assist power source (i.e., a second power source) 5 is provided. The assist power source 5 can output driving force for running according to power running control, and regenerate energy according to regenerative control. The assist power source 5 is connected to the output member 2 through a transmission 6. Accordingly, torque transmitted between the assist power source 5 and the output member 2 is increased or decreased according to a gear ratio set in the transmission 6.

The transmission 6 can be configured such that the set gear ratio becomes equal to or greater than "1". With this configuration, when the assist power source 5 outputs torque at the time of power running, the torque output by the assist power source 5 can be increased, and the increased torque can be transmitted to the output member 2. Therefore, capacity or size of the assist power source 5 can be made small. However, since it is preferable to maintain good operating efficiency of the assist power source 5, for example, when the rotational speed of the output member 2 is increased according to a vehicle speed, the gear ratio is reduced so as to decrease the rotational speed of the assist power source 5. Also, when the rotational speed of the output member 2 is decreased, the gear ratio may be increased.

Figure 4:
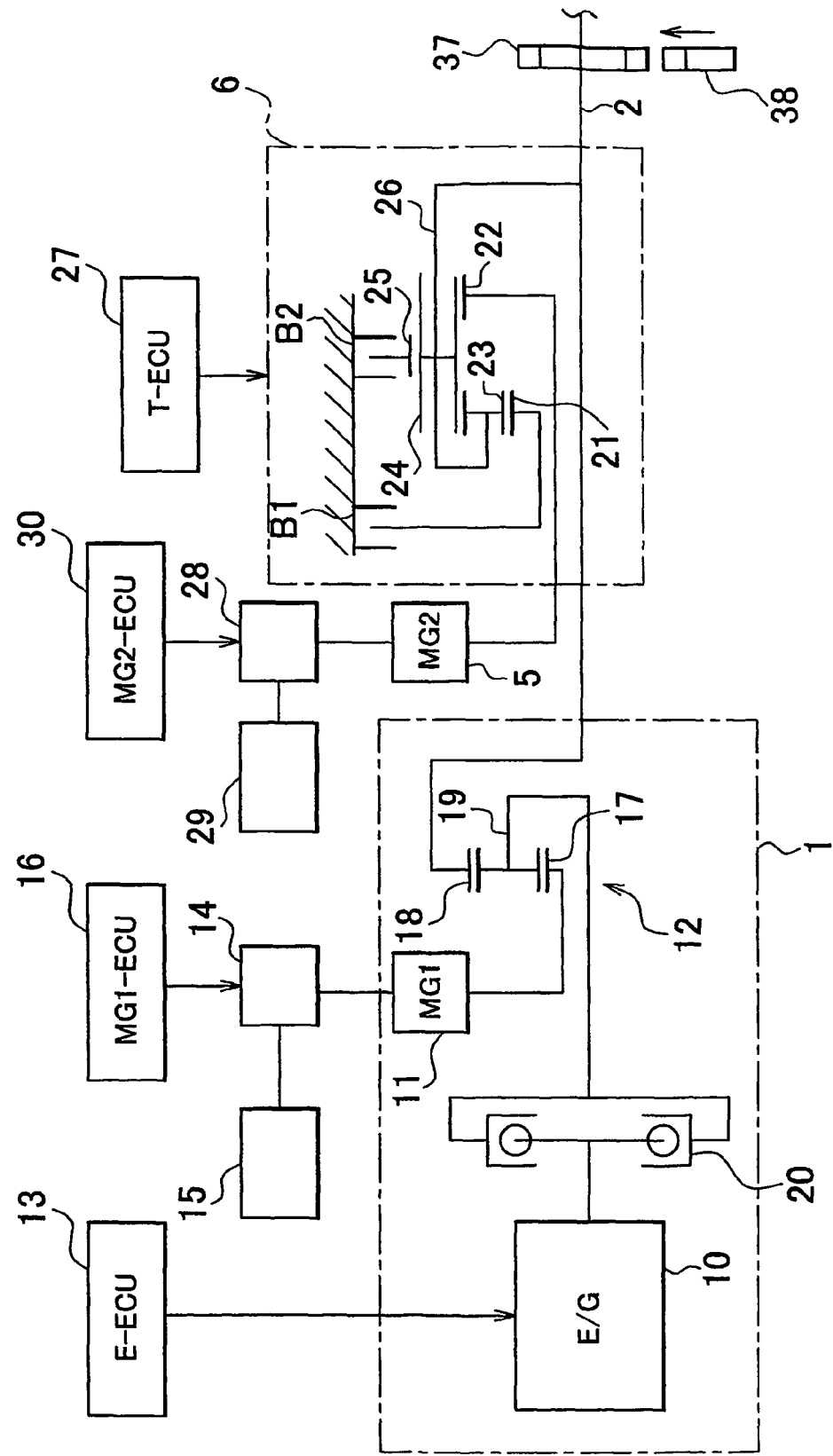
FIG. 4 is a skeleton diagram showing the drive apparatus for a hybrid vehicle according to the invention.

The hybrid drive apparatus will be described more specifically. As shown in FIG. 4, the main power source 1 mainly includes an internal combustion engine (hereinafter, simply referred to as "engine") 10, a motor/generator (hereinafter, referred to as "first motor/generator" or "MG1") 11, and a planetary gear 12 which serves as a torque combining splitting mechanism for combining torque of the engine 10 and torque of the first motor/generator 11, and distributing torque to the engine 10 and the first motor/generator 11. The engine 10 is a known power device which outputs power by burning fuel, such as a gasoline engine or a diesel engine. An operating state of the engine 10, such as a throttle valve opening degree (an intake air amount), a fuel supply amount, and ignition timing, can be electrically controlled. The control thereof is performed, for example, by an electronic control unit (E-ECU) 13 which mainly includes a microcomputer.

An example of the first motor/generator 11 is a permanent magnetic synchronous motor. The first motor/generator 11 functions both as the motor and the generator. The first motor/generator 11 is connected, through an inverter 14, to an electric power storage device 15 such as a battery. By controlling the inverter 14, the output torque or regenerative torque of the first motor/generator 11 is appropriately set. In order to perform this control, an electronic control unit (MG1-ECU) 16 which mainly includes a microcomputer is provided. A stator (not shown) of the first motor/generator 11 is fixed, and is not rotated.

Further, the planetary gear mechanism 12 is a known gear mechanism which includes three rotating elements, and which produces a differential effect. The three rotating elements are a sun gear 17 which is an external gear; a ring gear 18 which is an internal gear provided concentrically with the sun gear 17; and a carrier 19 which maintains a pinion that is engaged with the sun gear 17 and the ring gear 18 such that the pinion can be rotated around an axis thereof, and can move around the sun gear 17. The output shaft of the engine 10 is connected, through a damper 20, to the carrier 19 which is a first rotating element. In other words, the carrier 19 serves as an input element.

Meanwhile, the rotor (not shown) of the first motor/generator 11 is connected to the sun gear 17 which is a second rotating element. Accordingly, the sun gear 17 serves as a reaction force element. Also, the ring gear 18 which is a third rotating element serves as an output element. The ring gear 18 is connected to the output member (i.e., the output shaft) 2.

In the example shown in FIG. 4, the transmission 6 includes one set of Ravigneaux type planetary gear mechanism. That is, a first sun gear (S1) 21 and a second sun gear (S2) 22 are provided. Each of the first sun gear 21 and the second sun gear 22 is an external gear. A first pinion 23 is engaged with the first sun gear 21. A second pinion 24 is engaged with the first pinion 23. The second pinion 24 is engaged with a ring gear (R) 25 which is provided concentrically with each of the sun gears 21 and 22. A carrier (C) 26 maintains each of the pinions 23 and 24 such that each of the pinions 23 and 24 can be rotated around the axis thereof, and can be moved around the sun gear. The second sun gear 22 is engaged with the second pinion 24. Accordingly, the first sun gear 21, the ring gear 25, and the pinions 23 and 24 constitute a mechanism equivalent to a double pinion type planetary gear mechanism. The second sun gear 22, the ring gear 25, and the second pinion 24 constitute a mechanism equivalent to a single pinion planetary gear mechanism.

A first brake B1 which selectively fixes the first sun gear 21 is provided. A second brake B2 which selectively fixes the ring gear 25 is provided. Each of the brakes B1 and B2 is a so-called friction engagement device which produces engagement force using frictional force. As the brakes B1 and B2, multiple disc type engagement devices, or band type engagement devices may be employed. Torque capacity of each of the brakes B1 and B2 is continuously changed according to the engagement force caused by hydraulic pressure. Also, the assist power source 5 is connected to the second sun gear 22, and the carrier 26 is connected to the output shaft 2. Further, a parking gear 37 which fixes the output shaft 2 so that a vehicle is maintained in a parked state is fitted to the output shaft 2. Also, a parking lock pole 38 is provided. The parking lock ball 38 is engaged with the parking gear 37 so as to stop the rotation thereof when a parking position is selected by a shifting device (not shown).

Accordingly, in the aforementioned transmission 6, the second sun gear 22 serves as a so-called input element, and the carrier 26 serves as an output element. When the first brake B1 is engaged, a high shift speed is achieved at the gear ratio that is equal to or greater than "1". When the second brake B2 is engaged instead of the first brake B1, a low shift speed is achieved at the gear ratio that is greater than the gear ratio at which the high shift speed is achieved. Shifting between the shift speeds is performed based on a running state such as a vehicle speed or required driving force (or the accelerator angle). More specifically, a shift speed region is defined in advance as a map (shift diagram), and control is performed such that one of the shift speeds is achieved according to the detected running state. In order to perform this control, an electronic control unit (T-ECU) 27 which mainly includes a microcomputer is provided.

In the example shown in FIG. 4, as the assist power source 5, a motor/generator (hereinafter, referred to as "second motor/generator" or "MG2") is employed. This motor/generator 5 can output torque for power running, and can regenerate energy. An example of the second motor/generator 5 is a permanent magnetic synchronous motor. The rotor (not shown) thereof is connected to the second sun gear 22. Further, the second motor/generator 5 is connected to a battery 29 through an inverter 28. The inverter 28 is controlled by an electronic control unit (MG2-ECU) 30 which mainly includes a microcomputer, whereby power running and energy regeneration are controlled, and torque at the time of power running and torque at the time of energy regeneration are controlled. The battery 29 and the electronic control unit 30 can be integrated with the battery (electric power storage device) 15 and the electronic control unit 16. Also, a stator (not shown) of the second motor/generator 5 is fixed, and is not rotated.

Figure 5A:
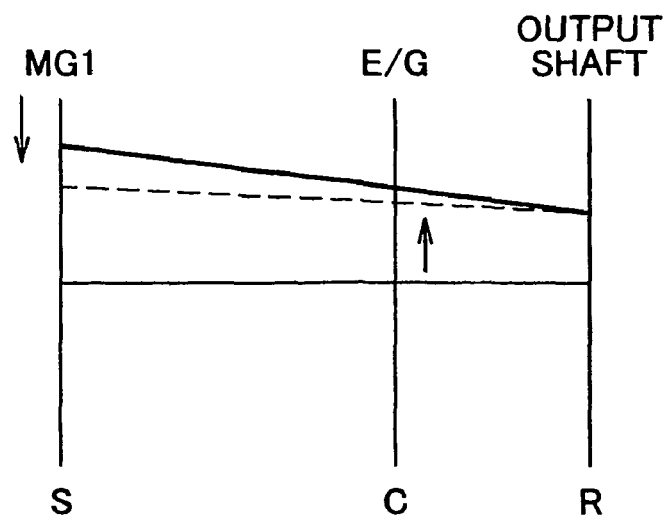
FIG. 5A and FIG. 5B are collinear diagrams relating to the drive apparatus.

FIG. 5A is a collinear diagram relating to the single pinion type planetary gear mechanism 12 which serves as the aforementioned torque combining splitting mechanism. When the reaction torque of the first motor/generator 11 is input to the sun gear (S) 17 against the torque input to the carrier (C) 19 from the engine 10, the torque input to the carrier (C) 19 is increased or decreased according to the torque input to sun gear (S) 17 and the gear ratio of the planetary gear mechanism 12, and the resultant torque is output from the ring gear (R) 18 which is the output element. In this case, the rotor of the first motor/generator 11 is rotated by the torque, and the first motor/generator 11 functions as the generator. Also, when the rotational speed (output rotational speed) of the ring gear 18 is maintained at a constant value, the rotational speed of the engine 10 can be continuously changed by increasing or decreasing the rotational speed of the first motor/generator 11. That is, the rotational speed of the engine 10 can be set to an engine rotational speed at which the fuel efficiency becomes optimal by controlling the first motor/generator 11.

Further, as shown by a chain line in FIG. 5A, when the engine 10 is stopped while the vehicle is running, the first motor/generator 11 is rotated in a reverse direction. When the first motor/generator 11 is caused to function as the motor and to output torque in a normal rotational direction thereafter, torque is applied to the output shaft of the engine 10 which is connected to the carrier 19 so that the output shaft is rotated in the normal rotational direction. Accordingly, the engine 10 can be started (motoring or cranking can be performed) by the first motor/generator 11. In this case, torque is applied to the output shaft 2 in such a direction as to stop the rotation thereof. Accordingly, the driving torque for mining can be maintained by controlling the torque output from the second motor/generator 5, and the engine 10 can be smoothly started at the same time. This hybrid type is referred to as "mechanical split type" or "split type".

Figure 5B:
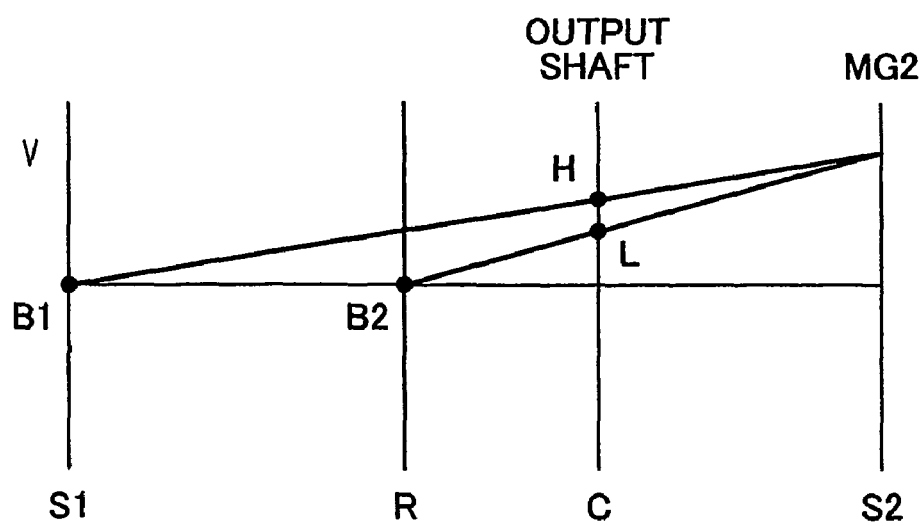

FIG. 5B is a collinear diagram relating to the Ravigneaux type planetary gear mechanism constituting the transmission 6. That is, when the ring gear 25 is fixed by the second brake B2, a low speed L is achieved. The torque output from the second motor/generator 5 is amplified according to the gear ratio, and the amplified torque is applied to the output shaft 2. Meanwhile, when the first sun gear 21 is fixed by the first brake B1, a high speed H is achieved at the gear ratio which is less than the gear ratio at which the low speed L is achieved.

The gear ratio at which the high speed H is achieved is also greater than "1". Therefore, the torque output from the second motor/generator 5 is increased according to the gear ratio, and the increased torque is applied to the output shaft 2.

While the shift speed is set to the low speed L or high speed H in a steady state, the output torque of the second motor/generator 5 is increased according to the gear ratio, and the increased torque is applied to the output shaft 2. However, in a shift transition state, the torque applied to the output shaft 2 is influenced by the torque capacity of the brake B1 or B2, inertia torque caused by a change in the rotational speed, and the like. The torque applied to the output shaft 2 is positive torque when the second motor/generator 5 is in a driving state. The torque applied to the output shaft 2 is negative torque when the second motor/generator 5 is in a driven state.

The aforementioned hybrid drive apparatus includes two power sources, that are, the main power source 1 and the assist power source 5. Therefore, these two power sources are effectively used so as to improve fuel efficiency and to reduce the amount of exhaust gas while the vehicle runs. Also, even in a case where the engine 10 is driven, the rotational speed of the engine 10 is controlled using the first motor/generator 11 so that the fuel efficiency becomes optimal. Further, during coasting, inertia energy of the vehicle is recovered to generate electric power. In a case where the second motor/generator 5 is driven for torque assist, when the vehicle speed is low, the shift speed is set to the low speed L in the transmission 6, and the torque applied to the output shaft 2 is increased. When the vehicle speed has become high, the shift speed is set to the high speed H in the transmission 6, and the rotational speed of the second motor/generator 5 is relatively decreased so as to reduce loss, whereby torque assist is efficiently performed.

The aforementioned hybrid vehicle can run using power produced by the engine 10. Also, the hybrid vehicle can run using the engine 10 and the second motor/generator 5. Further, the hybrid vehicle can run using only the second motor/generator 5. One of these running modes is selected based on required driving force, the vehicle speed, and the like. For example, when a charge amount of the battery is sufficient, and the required driving force is relatively small, or when a mode for taking off quietly is manually selected, the running mode in which the vehicle runs using the second motor/generator 5 like an electric vehicle (hereinafter, referred to as "EV running") is selected, and the engine 10 is stopped. For example, when the accelerator pedal is depressed to a large extent thereafter, and the required driving force is increased, when the charge amount of the battery is decreased, or when the mode for taking off quietly is manually changed to a mode for normal running, the engine 10 is started, and the running mode in which the vehicle runs using the engine 10 (hereinafter, referred to as "E/G running") is selected.

Meanwhile, the shift speed in the transmission 6 is set by changing the engagement/disengagement state of each of the first brake B1 and the second brake B2, as described above. Each of the first brake B1 and the second brake B2 is engaged/disengaged by controlling hydraulic pressure supplied to each of the first brake B1 and the second brake B2 according to the torque transmitted by the transmission 6. A relationship between the torque transmitted by the transmission 6 and the hydraulic pressure is stored in a form of a map. Accordingly, in order to perform shifting quickly or by the minimum hydraulic pressure, it is necessary to correctly detect the relationship between the torque transmitted by the transmission 6 and a hydraulic pressure command value. Therefore, control described below is performed.

FIG. 1 is a flowchart showing learning control for detecting the relationship between the torque and the hydraulic pressure command value. This control is performed when the torque of the second motor/generator does not need to be transmitted, for example, when a parking position is selected as a running range. Also, this learning control may be performed when the vehicle is adjusted on a production line.

First, a target rotational speed of feedback control is set so that the rotational speed of the second motor/generator 5 becomes equal to the predetermined target rotational speed (step S01). This target rotational speed is set to a predetermined point on a shift diagram. Plural target rotational speeds may be set.

Then, control of the rotational speed of the second motor/generator 5 is started (step S02). When the rotational speed of the second motor/generator 5 becomes equal to the target rotational speed after the control of the rotational speed is started, motor torque Tmini is detected and stored (step S03). This motor torque Tmini is equivalent to drag torque of the brake, and can be obtained based on a value of electric current flowing in the second motor/generator 5. In other words, it is possible to detect the motor torque when the hydraulic pressure command value is zero, that is, the motor torque when the brake B1 (or B2) is disengaged. Since the torque Tmini constantly fluctuates, an average value may be obtained at predetermined time intervals, or smoothing processing such as filter processing may be performed.

After the control of the rotational speed of the second motor/generator 5 is started, and the rotational speed becomes stable, the engagement of the brake B1 (or B2) is started. More specifically, the hydraulic pressure supplied to the brake B1 (or B2) starts to be increased (step S04). Thus, motor torque Tminig output from the second motor/generator 5 starts to be increased. That is, when the hydraulic pressure is supplied to the brake B1 (or B2), a pack clearance which has been generated in the brake B1 (or B2) is gradually reduced (gradually becomes small), and accordingly the torque transmitted through lubricating oil between friction surfaces, that is, the drag torque is increased, which leads to an increase in the motor torque Tminig.

Then, it is determined whether the motor torque Tminig exceeds a value obtained by a predetermined value α to the motor torque Tmini (step S05). The predetermined value α is an expected value of an increase amount of the motor torque when the brake B1 starts to transmit the torque. The predetermined value α is obtained in advance through experiments or calculation. Since this predetermined value α is considered, it can be determined whether the engagement of the brake B1 (or B2) has been started while preventing influence of production deviation, noise, or the like. Since this motor torque Tminig constantly fluctuates, the average value may be obtained at predetermined time intervals, or smoothing processing such as filter processing may be performed.

When a negative determination is made in step S05, no particular process is performed, and the routine is finished. Then, the motor torque Tminig continues to be increased until an affirmative determination is made in step S05. Meanwhile, when an affirmative determination is made in step S05, that is, when the engagement of the brake B1 (or B2) has been completed, a hydraulic pressure command value Pbt at this time point is detected (step S06). Thus, necessary torque when the brake B1 (or B2) is engaged can be detected. This control is performed for the brake B1 first, and then the control is performed for the brake B2. However, the control may be performed for the brake B2 first, and then the control may be performed for the brake B1.

Since the control is performed, two sets of values can be calculated. That is, necessary hydraulic pressure when the brake B1 is disengaged and necessary hydraulic pressure when the brake B1 is engaged, and necessary hydraulic pressure when the brake B2 is disengaged and necessary hydraulic pressure when the brake B2 is engaged are calculated. Based on the two sets of the values, the T-ECU 27 renews a torque—hydraulic pressure conversion map which is stored in the T-ECU 27 (step S07). Then, learning is finished (step S08).

Figure 2:
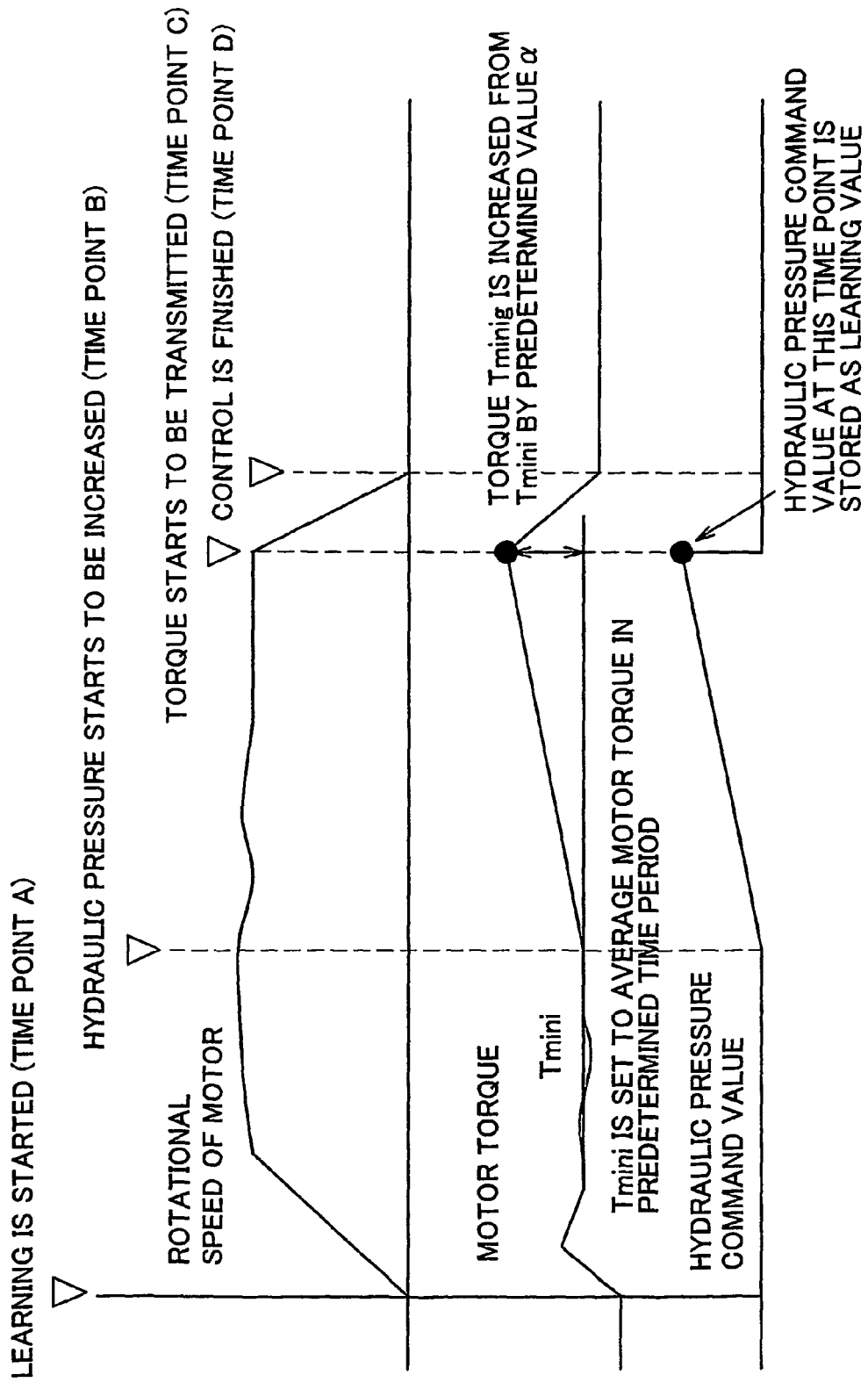
FIG. 2 is a time chart in a case where control according to the invention is performed.

Next, a change with time in the aforementioned embodiment will be described. FIG. 2 is a time chart showing a change with time. First, learning is started (a time point A), and the target rotational speed of the second motor/generator 5 is set (this process corresponds to step S01). When the second motor/generator 5 starts to be rotated (this process corresponds to step S02), the motor torque during this time period is detected (this process corresponds to step S03, from the time point A to a time point B). The detected torque is drag torque.

After the hydraulic pressure command value for the brake B1 (or B2) is gradually increased from zero (this process corresponds to step S04, the time point B), the motor torque starts to be increased in accordance with the engagement hydraulic pressure command value. This increase in the motor torque is caused mainly by the drag torque. When the engagement proceeds (from the time point B to a time point C), and the motor torque reaches a value obtained by adding the predetermined value α to the drag torque, that is, a predetermined torque transmission point that has been obtained in advance through experiments or calculation (this process corresponds to step S05, the time point C), the hydraulic pressure command value Pbt at this time point is stored (this process corresponds to step S06). During this time period, that is, during a time period from the time point B to the time point C, the rotational speed of the second motor/generator 5 is maintained at a constant value.

After the hydraulic pressure command value is stored, the hydraulic command value is set to zero, and the target rotational speed of the motor is set to zero. Then, the control is finished (from the time point C to a time point D).

As has described so far, when an engagement control amount of the brake B1 (or B2) that is provided between the second motor/generator 5 and the output shaft is changed while the rotational speed of the second motor/generator 5 is maintained at the predetermined rotational speed, torque acting on the second motor/generator 5 is changed, and therefore, torque necessary for maintaining the rotational speed is changed. The output torque of the second motor/generator 5 can be accurately detected, for example, based on the electric current value. Since the output torque corresponds to the torque capacity of the brake B1 (or B2), when the output torque of the second motor/generator 5 reaches the predetermined value, it is possible to learn the relationship between the output torque of the motor/generator 5 and the engagement control amount, that is, the relationship between the torque capacity of the brake B1 (or B2) and the engagement control amount, without being influenced by noise or the like. Accordingly, it is possible to accurately learn the characteristic of the brake B1 (or B2) during the initial state of the engagement.

Also, since the initial torque of the second motor/generator 5 is detected while the engagement control amount is zero, the initial torque is detected as the drag torque of the brake B2 (or B2). Therefore, it is possible to accurately detect the drag torque of the brake B1 (or B2). Also, when the output torque of the second motor/generator 5 exceeds the torque obtained by adding the predetermined value to the drag torque while the engagement control amount is changed, the relationship between the engagement control amount and the torque capacity of the brake B1 (or B2) is learned. Therefore, it is possible to accurately learn the initial characteristic of the brake B1 (or B2) considering the drag torque.

In the aforementioned embodiment of the invention, functional means in step S02 can be regarded as "maintaining means", and functional means in step S04 can be regarded as "changing means". Also, functional means in step S06 can be regarded as "learning means", and functional means in step S03 can be regarded as "detecting means".

The invention claimed is:

1. A control apparatus for a drive apparatus of a hybrid vehicle, in which a motor is connected to an output member connected to a main power source through a torque transmitting member whose torque capacity is changed according to a hydraulic pressure command value, comprising:
   maintaining means for maintaining a rotational speed of the motor at a predetermined rotational speed;
   changing means for continuously changing the hydraulic pressure command value from zero while the maintaining means maintains the rotational speed of the motor at the predetermined rotational speed; and
   learning means for learning a relationship between an output torque of the motor for maintaining the rotational speed of the motor at the predetermined rotational speed and the hydraulic pressure command value when the output torque of the motor increases to a predetermined value while the hydraulic pressure command value is changed from zero.

2. The control apparatus according to claim 1, further comprising:
   detecting means for detecting an initial output torque of the motor while the hydraulic pressure command value is zero, and the predetermined value is set to a value obtained by adding a predetermined torque to the initial output torque detected by the detecting means.

3. The control apparatus according to claim 2, wherein the detecting means detects the initial output torque when the rotational speed of the motor becomes equal to the predetermined rotational speed.

4. The control apparatus according to claim 1, wherein the relationship between the output torque of the motor and the hydraulic pressure command value is learned at at least one of a time when a parking position is selected as a running range in the hybrid vehicle, and a time when the hybrid vehicle is adjusted on a production line.

5. The control apparatus according to claim 1, wherein the control apparatus is executed when the hybrid vehicle is stopped.

6. A control apparatus for a drive apparatus of a hybrid vehicle, in which a motor is connected to an output member connected to a main power source through a torque transmitting member whose torque capacity is changed according to a hydraulic pressure command value, comprising:
   a first control device which maintains a rotational speed of the motor at a predetermined rotational speed;
   a second control device which continuously changes the hydraulic pressure command value from zero while the first control device maintains the rotational speed of the motor at the predetermined rotational speed; and
   a third control device which learns a relationship between an output torque of the motor for maintaining the rotational speed of the motor at the predetermined rotational speed and the hydraulic pressure command value when the output torque of the motor increases to a predetermined value while the hydraulic pressure command value is changed from zero.

7. The control apparatus according to claim 6, further comprising:
a detector that detects an initial output torque of the motor while the hydraulic pressure command value is zero, and the predetermined value is set to a value obtained by adding predetermined torque to the initial output torque detected by the detector.

8. The control apparatus according to claim 7, wherein the detector detects the initial output torque when the rotational speed of the motor becomes equal to the predetermined rotational speed.

9. The control apparatus according to claim 6, wherein the relationship between the output torque of the motor and the hydraulic pressure command value is learned at at least one of a time when a parking position is selected as a running range in the hybrid vehicle and a time when the hybrid vehicle is adjusted on a production line.

10. The control apparatus according to claim 6, wherein the control apparatus is executed when the hybrid vehicle is stopped.

11. A control method for a drive apparatus of a hybrid vehicle in which a motor is connected to an output member connected to a main power source through a torque transmitting member whose torque capacity is changed according to a hydraulic pressure command value, comprising:
maintaining a rotational speed of the motor at a predetermined rotational speed;
continuously changing the hydraulic pressure command value from zero while maintaining the rotational speed of the motor at the predetermined rotational speed; and
learning a relationship between an output torque of the motor and the hydraulic pressure command value when the output torque of the motor for maintaining the rotational speed of the motor at the predetermined rotational speed increases to a predetermined value while the hydraulic pressure command value is changed from zero.

12. The control method according to claim 11, wherein the control method is executed when the hybrid vehicle is stopped.

* * * * *

UNITED STATES PATENT AND TRADEMARK OFFICE
CERTIFICATE OF CORRECTION

PATENT NO. : 7,789,177 B2 Page 1 of 1
APPLICATION NO. : 10/550738
DATED : September 7, 2010
INVENTOR(S) : Hiroatsu Endo It is certified that error appears in the above-identified patent and that said Letters Patent is hereby corrected as shown below:

| Column | Line | |
|---|---|---|
| 1 | 32 | Replace "rotation shalt" with --rotation shaft--. |

Signed and Sealed this

Twenty-third Day of November, 2010

David J. Kappos
*Director of the United States Patent and Trademark Office*